Dec. 19, 1961   M. H. OLSON ET AL   3,013,893
OIL-STAIN RESISTANT GRANULES AND PRODUCTS EMPLOYING THE SAME
Filed Feb. 8, 1960
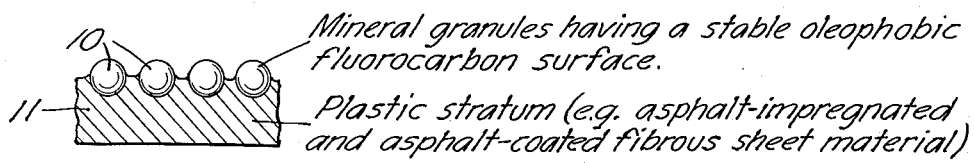
10 — Mineral granules having a stable oleophobic fluorocarbon surface.
11 — Plastic stratum (e.g. asphalt-impregnated and asphalt-coated fibrous sheet material)
INVENTORS
MAYNARD H. OLSON
DONALD E. LOVNESS
ATTORNEYS
Carpenter, Abbott, Coulter & Kinney United States Patent Office 3,013,893
Patented Dec. 19, 1961

3,013,893
OIL-STAIN RESISTANT GRANULES AND PRODUCTS EMPLOYING THE SAME
Maynard H. Olson, St. Paul, and Donald E. Levness, Grant Township, Washington County, Minn., assignors to Minnesota Mining and Manufacturing Company, St. Paul, Minn., a corporation of Delaware
Filed Feb. 8, 1960, Ser. No. 7,491
12 Claims. (Cl. 117—27)

The present invention relates to the prevention of oil-staining or discoloration of the granular surfacing of plastic strata, such as bituminous roofing material, occasioned by adsorption over the granule surfaces of migratory lightweight oil fractions present in the strata. More particularly, the invention pertains to oil-stain resistant granular materials, such as, for example, artificially-colored roofing granules, and to resultant plastic strata employing such granular materials as surfacing. This application is a continuation-in-part of our copending application Ser. No. 576,689, filed April 6, 1956, now abandoned.

Roofing granules, both natural and artificially color-coated granules, find extremely wide use in roofing and siding materials. One important such use is in bituminous roll roofing and asphalt shingles. The granules form a coating partially embedded in one surface of asphalt-impregnated and asphalt-coated fibrous sheet material to provide an adherent weather-resistant and decorative exterior surface.

The asphalt in the bituminous compositions invariably contains amounts of light-weight oil fractions. Presence of these oil fractions, which are characteristically migratory, is particularly prevalent in bituminous roofing and siding compositions during the period, often several weeks or months, after manufacture but prior to final installation out-of-doors. It is during this period that oil-staining of the granule surfacing occurs. The light-weight oil fractions slowly but incessantly migrate over and are adsorbed by the protruding granule surface, thus imparting a stained or discolored appearance to the granules. The problem of oil-staining is particularly acute in the case of light-colored and bright-colored granules, although it is by no means confined thereto. Darker-colored granules are also adversely affected by oil-staining.

The discoloration due to oil-staining occurs whether the granules are used in their natural state or are artificially colored. The problem is most important, however, in the latter case due both to the comparatively larger volume used and to the delicate shades of color available in artificially colored granules which are affected to a greater degree.

It is during the period when the oil-discoloration is at its worst, namely prior to permanent installation, that roofing and siding is displayed for sale. Roofing having a dirty and stained appearance is not well received by customers. Statements to the customers that the discoloration will disappear once the roofing is exposed to sunlight for long periods is hardly reassuring, even though this is true to some degree, apparently because the sunlight oxidizes the oils to a water-soluble state whereupon they are ultimately washed away by rain, snow, etc. Moreover, the fact that the discoloration is removed to some extent upon exposure sometimes compounds the difficulty rather than eliminating it. For example, the extent to which the discoloration, once present, is removed in some measure varies with the amount and intensity of sunlight to which a particular portion or section of the roofing is subjected. Hence, where one portion of the roofing in a dwelling or structure receives greater amounts of sunlight than another, as where the structure is situated in the northern portion of the U.S., uncomplimentary and undesirable non-uniformity of color in the roofing or siding is likely to result.

It might be suggested that a seemingly obvious expedient for overcoming the problem of oil-staining of the granule surfacing in bituminous roofing would be merely to coat the granules with an oil-repellent material prior to their being embedded in the asphalt. On the contrary, however, the art has long considered it necessary that the normally hydrophilic granule surfaces be rendered oleophilic (that is, organophilic or oil receptive) rather than oleophobic (oil repellent) in order that the requisite high degree of adhesion between the granules and the asphalt surface be attained. See, for example, Keene et al., U.S. Patent No. 2,595,465, granted on May 6, 1952, and Jewett, U.S. Patent No. 2,164,329, granted on July 4, 1939, which patents indicate the desirability of imparting an oleophilic surface to roofing granules. Hence, it would appear to be undesirable to treat roofing granules with an oil-repellent compound since it would be expected that the capacity of the granules to thereafter form an adherent bond to an asphalt surface would be materially lessened if not destroyed entirely.

We have discovered means by which the aforementioned difficulties with oil-staining or discoloration of the granule surfacing in plastic strata are obviated, the capacity of the granules to form an adherent bond with the roofing surface being at the same time maintained at a high level. Indeed, in some respects this bonding capacity is materially increased over heretofore known granules. In accomplishing our objectives, we pretreat the granules with a relatively small quantity of stable oleophobic fluorocarbon sizing agent applied to the surface of the granules as a suitably dilute solution or dispersion in a volatile liquid vehicle so that, upon drying, the granule surfaces are rendered stably oleophobic. The treated granules are thus rendered repellent to the light-fraction oils of the asphalt to which they are subsequently applied. Oil-staning does not occur. The treatment is stable, that is, it is highly adherent and/or inter-reacted with the granule surface whereby the oil-resistant characteristics of the treated granules are long-lasting.

Surprisingly, however, even though the surfaces of the granules are rendered oleophobic by the stable oleophobic fluorocarbon sizing agent, the granules nevertheless adhere firmly to the asphalt surface to which they are later applied, the adhesion in some instances being even superior to that attained heretofore. For example, the adhesion between our treated granules and the asphalt surface, under dry conditions, is at least as great as that attained in heretofore known bituminous roofing. Moreover, adhesion under wet conditions is substantially improved in the case of the granules of the present invention. This has been shown to be the actual case, not only by special laboratory tests, hereinafter to be described, but under conditions encountered in natural aging as well.

These surprising characteristics have important significance in the production of bituminous roofing compositions such as that shown in the accompanying schematic sectional drawing wherein granules 10 (having a stable oleophobic fluorocarbon surface) are embedded in a plastic stratum 11 consisting, for example, of asphalt-impregnated and asphalt-coated fibrous sheet material. In presently practiced commercial operations granule surfacing is formed on the roofing by applying the granules as a layer or coating to the heated and melted asphalt surface of the asphalt sheet and pressing them into the melted surface by means of rollers. Water is then customarily sprayed over the sheet to rapidly cool and harden the asphalt in order to render the sheet handleable as rapidly as possible so as to economize on space and equipment. The roofing then, often while still quite wet, is cut into the desired sizes and stacked or rolled into roll form for packaging and shipping. Considerable abrading of the surface of the roofing occurs during the stacking operations. If the adhesion is materially lessened due to the effect of the water, granules are easily abraded from the roofing surface either then or later during the further abrasion to which the roofing is subjected when ultimately applied in place. Thus, in satisfactory bituminous roofing, adhesion between the granules and the asphalt must be great under wet as well as dry conditions.

It is not at all apparent exactly why the dry adhesion between our treated granules and the asphalt surface is so high. Good adhesion between two objects generally is predicated upon good "wetting" one by the other at the contacting interface. Yet the granules hereof are not "wet" by oils nor apparently by the asphalt surface.

It is suspected, however, although we do not intend to be bound by our theory, that the high wet adhesion characteristics of the treated granules are produced by the fact that the treated granule surfaces are also highly hydrophobic (due to the fact that stable coatings of oleophobic fluorocarbon sizing agents are inherently also hydrophobic). This being the case, the water cannot wet the granule surfaces and thus loosen an otherwise effective adhesive bond.

Oleophobic fluorocarbon sizing agents as a class are carbon compounds which are chemically characterized by having in the molecule one or more highly fluorinated or perfluorinated terminal chains or side chains serving as fluorocarbon "tails." The "tails" are both oleophobic and hydrophobic, in contrast to a corresponding hydrocarbon chain, which is oleophilic. The molecule also includes one or more hydrophilic active polar groups which serve to bond the molecule to hydrophilic surfaces when the compound is coated on such a surface. A polymeric molecule will include a large number of fluorocarbon "tails." Oleophobic fluorocarbon sizing agents are presently available commercially from the Minnesota Mining and Manufacturing Company of St. Paul, Minnesota.

The sizing compound is applied to the granules as a dilute solution or dispersion preferably in water, although some or all of the water may be replaced by a volatile organic solvent or dispersant. Upon drying, a minute coating is provided upon the hydrophilic substrate surface. In most instances, the resultant dried coating is invisible on the granule surface, even upon microscopic examination. In fact, indications are that the layer is substantially of monomolecular thickness. The coating is tenaciously bonded to the substrate with the hydrophilic groups in contact therewith and with the fluorocarbon "tails" oriented outwardly from the substate. Thus the outer surface of the coating has a fluorocarbon-like characteristic that renders it both hydrophobic and oleophobic.

Preferred oleophobic fluorocarbon sizing agents are fluorocarbon monocarboxylic acids and certain derivatives thereof. Preferred fluorocarbon monocarboxylic acids are the perfluoroalkanesulfonamide alkylenemonocarboxylic acids, e.g. N-methyl, N-perfluorooctanesulfonyl glycine, which have a fluorocarbon "tail" at one end of the molecule and a functional polar carboxylate "head" group at the other end of the molecule, the groups being linked together by an interposed sulfonamidealkylene "body" group. Preferably the fluorocarbon "tail" group in these acids consists of 5 to 10 fluorinated carbon atoms. The perfluoroalkanesulfonamido alkylenemonocarboxylic acids and their preparation are described in the United States application of Harvey A. Brown, Serial No. 556,047, filed December 29, 1955, now Patent No. 2,809,990.

Another type of highly suitable fluorocarbon monocarboxylic acid is the partially or entirely fluorine-substituted counterpart of aliphatic carboxylic acids which have a functional polar carboxylate "head" group at one end of the molecule and a fluorocarbon "tail" connected thereto at the other end of the molecule, this "tail" also preferably consisting of 5 to 10 fluorinated carbon atoms. Fluorocarbon acids of this latter type and their preparation are described in Diesslin et al., U.S. Patent No. 2,567,011, granted on September 4, 1951.

These acid compounds can be employed in the form of the free acid, or the metal or ammonium salts of the acid; or they can be used in the form of certain polyvalent metal coordination complexes. When the acid or metal salts are employed it is necessary that the granules first have applied thereto a "pickle" treatment with a polyvalent metal halide, e.g. an aluminum chloride pickle treatment as described and claimed in Buzzell et al., U.S. Patent No. 2,614,051, granted on October 14, 1952. We have found that in such a case the polyvalent metal ions present on the granule surfaces react with the acid radicals to provide an in situ formed insolubilized stable coating—apparently a polyvalent metal coordination complex of the acid.

Where the polyvalent metal complexes, e.g. the aluminum, chromium, or zirconium complexes, are employed, it is unnecessary (though still desirable) that the granules have a prior polyvalent metal halide pickle treatment. Thus, the polyvalent metal complexes of the fluorocarbon acids may be employed in treating "raw" mineral granules, i.e. granules suitable for use in connection with roofing having no pickle treatment or artificial color-coating. When these complexes are applied to the granule surfaces from a dilute solution or dispersion, they apparently complex in situ to a molecularly more advanced state, more or less independently of the existence or absence of other polyvalent metal ions, to thereby become insolubilized in situ and extremely stable. It should be cautioned, however, that where artificially color-coated granules are to be treated which have not had a previously applied pickle treatment, the alkalinity of the granules should be insufficient to decompose the coordination complex of the sizing agent.

The polyvalent metal complexes of both of the above-mentioned types of fluorocarbon monocarboxylic acids are readily prepared. For example, the chomium complexes are prepared by reacting the desired fluorocarbon acid with chromyl chloride. The chromium complexes of the perfluoroalkanesulfonamido alkylenemonocarboxylic acids and the preparation thereof are described in the U.S. application of Harvey A. Brown, Serial No. 556,039, filed December 29, 1955, now Patent No. 2,934,450. The chromium complexes of the fluorocarbon monocarboxylic acids and the preparation thereof are described in Reid, U.S. Patent No. 2,662,835, granted on December 15, 1953. Generally, in either type the reaction between the acid and the chromyl chloride is carried out in an isopropanol vehicle which serves both as a solvent and as a reducing agent, a suitable mole ratio being 3 moles of chromyl chloride per mole of fluoro carbon acid. Volatile side products can be removed by distillation. The green-colored isopropanol solution of the chromyl complex is diluted with water at time of use to provide a sizing solution containing a few-tenths of a percent or less of the chromium complex.

Types of fluorocarbon oleophobic sizing agents other than those above-described may also be suitably employed. For instance, the fluorocarbon "tail" of the molecule may be connected, directly or indirectly to other active polar groups which will react with or adhere to a hydrophilic surface, e.g. the polymer product of 1,1-dihydroperfluorobutyl acrylate (described in Ahlbrecht et al., U.S. Patent No. 2,642,416, granted on June 16, 1953), may be suitably employed.

Having now generally described our invention, the following non-limitative examples of certain preferred embodiments will more specifically illustrate the same. Unless otherwise indicated, amounts are listed in parts by weight.

*Example I*

A slurry of N-methyl, N-perfluorooctanesulfonyl glycine, $C_8F_{17}SO_2N(CH_3)CH_2COOH$, prepared according to the procedures set out in the aforementioned Brown application S.N. 556,047, now Patent No. 2,809,990, was prepared by adding 13.6 parts by weight of the acid to about 75 parts by weight of a vehicle consisting of 80 percent by weight of water and 20 percent isopropyl alcohol. The acid was just neutralized with concentrated ammonium hydroxide solution, during which time solution was effected. Additional water-isopropyl alcohol vehicle was then added to bring the total weight of solution to 100 parts and thereby to reduce the concentration to 14 percent solids.

White artificial roofing granules were prepared by completely and uniformly coating 2000 pounds of crushed and graded (—10+35 mesh) argillite granules with a suspension of 55 pounds of titanium dioxide pigment, 32 pounds of kaolin clay in a binder solution of 70 pounds of "K" brand aqueous sodium silicate (11.0% $Na_2O$:31.2% $SiO_2$) and 30 pounds of water; pre-drying the coated granules in the mixer by passing a stream of air therethrough; and further drying and firing the coated granules in a rotary direct-fired kiln at a temperature of 950° F. The hot coated granules were then transferred to a rotary cooler, through which an air stream was passing, where they were first partially cooled by sprays of water. As the granules traveled further along the cooler, they were sprayed with a dilute aqueous solution of equal parts of aluminum chloride and ammonium chloride, the application being controlled such that approximately one pound of each salt was applied to the coated granules per ton of original uncoated granules. The concentration of the pickle solution was such that when the spray water had been all evaporated by the residual heat in the granules the granule temperature had been reduced to about 250° F.

The oleophobic fluorocarbon sizing agent solution, prepared as above described, and diluted with water just prior to application to a solids content of about 0.2%, was then sprayed on the still hot granules at a rate such that 0.08 pound of the sizing agent was applied per ton of the original uncoated granules. The residual heat from the granules quickly caused the liquid vehicle to flash off or evaporate leaving a dried extremely thin treatment of the sizing agent on the granule surfaces.

Following this a light-weight colorless petroleum oil was sprayed on the granules at the rate of 5 pounds per ton of original uncoated granules to reduce dusting.

The resulting white treated granules were then employed in the preparation of bituminous roll roofing and asphalt shingles. They were applied as a layer of coating to the heated asphalt-impregnated and asphalt-coated fibrous base sheet material, and pressed into place by means of rolls. Water was then sprayed over the sheet so as to rapidly cool and harden the asphalt preparatory to the cutting and packing of the finished roofing. Portions of the roofing thus prepared were subjected to accelerated aging tests in order to determine the resistance of the granule surfacing to staining by the light-fraction oils in the asphalt and also to determine the sufficiency of adhesion between the granules and the asphalt base.

Stain-resistance was determined first. Samples having a size of about 2¾ inch x 5⅞ inch were cut from the sheets of the roofing. Several of the samples were heated for 24 hours in a 176° F. infra-red oven. At the end of the period the test samples were removed and compared with others of the samples which had not been heated, to determine the degree of oil-standing which occurred in the test samples. No visual evidence of staining appeared in the granules of the tested samples. In fact, these granules retained their original bright white color and were indistinguishable from the surfacing of samples which had not been tested.

The staining test above just described has been found to accurately portray stain-resistance (or lack thereof) of samples tested. That is, where the granule surfacing of roofing would adsorb oils from the asphalt and become stained or discolored within a few weeks or months under natural aging conditions, a corresponding degree of staining or discoloration occurs in samples of the same roofing which are subjected to the above described oil-stain test. On the other hand, experience has shown that where test samples of granules surfaced roofing indicate no visible discoloration during the 24 hours in the test oven, correspondingly, neglible or no staining or discoloration occurs under natural aging conditions.

Other test samples of the roofing sheet of the present example were cut to a rectangular size of 2" by 9" and subjected to tests for determining the sufficiency of adhesion between the granules and the asphalt base. In the test, a strip of the dry roofing is first weighed and then rigidly clamped into a flat position. A stiff wire brush having a rectangular bristle area of 15/16 inches by ⅞ inch is then brushed back and forth lengthwise over the granule surfacing, the length of the brush being transverse to the length of the sample. The force of the brush against the sample is 5 pounds. The length of the brush stroke is 6¼ inches. Fifty brushing cycles, that is, 50 strokes in each direction, are completed in each test. The sample is then removed and again weighed. The test is repeated on approximately one dozen test samples taken from the same roofing and the average weight loss per sample is determined, which loss may be attributed substantially entirely to granules removed by the bushing. This first test on the dry samples is known as a "dry rub test."

The same test samples are then immersed in water for about 2 hours and the rub test is repeated, this being known as the "wet rub test."

When samples of the roofing of the present example were subjected to the dry and wet rub tests, the average weight loss was about 0.3 gram/sample and about 0.6 gram/sample, respectively.

Identical tests performed on identically manufactured roofing (which itself has seen wide commercial use), with the exception that the treatment with the oleophobic fluorocarbon sizing agent was omitted, had dry rub and wet rub test values of 0.3 gram/sample and 1.4 grams/sample, respectively.

*Example II*

Blue-colored artificial roofing granules were prepared by uniformly coating 2000 pounds of syenite granules previously crushed and graded (—10+35 mesh) with a dispersion of 34 pounds of ultramarine blue pigment and 16 pounds of kaolin in solution of 65 pounds of "N" grand aqueous sodium silicate (8.85% $Na_2O$:28.5% $SiO_2$) and 20 pounds of water. The granules were then pre-dried and fired as described in connection with Example I. The granules were cooled somewhat by water sprays followed by a spray application of a dilute aqueous solution of equal parts by weight of a pickle treatment of aluminum chloride and ammonium chloride, the rate of application being 0.5 pound each per ton of uncoated granules. Solution concentration was adjusted such that the temperature of the granules (after evaporation of the water) was reduced to about 250° F.

A 0.2 percent aqueous solution of the chromium complex of perfluorooctanoic acid, prepared according to the procedures described in the aforesaid U.S. Patent No. 2,662,835, was then applied to the granules at a rate of 0.025 pound of the fluorochemical per ton of uncoated granules. Upon application of the sizing compound, the residual heat caused the liquid vehicles to flash off or evaporate leaving a dried stable oleophobic fluorocarbon surface on the granules. A further treatment with lightweight petroleum oil was then applied to the granules at the rate of 5 pounds per ton of granules to reduce dusting.

The granules were then employed in the manufacture of bituminous roofing as described in the preceding example. Samples of the resulting roofing material were subjected to the oil-stain test and the dry and wet rub tests described in Example I. No oil-staining or discoloration was observed on the samples subjected to the oil-stain tests. Performance of samples subjected to the dry and wet rub tests were extremely satisfactory, the average weight loss being about 0.3 gram/sample and about 0.7 gram per sample, respectively.

The oleophobic characteristics of the sized granules is easily demonstrated by a simple test. A small pile of the treated granules is first formed on any suitable flat test surface and then flattened with the fingers. A drop or two of heavy-weight oil, e.g. SAE 30 weight, is then deposited onto the granule pile and observed. The drops remain perched on top of the pile; they do not flow down through the pile between the granules, as they otherwise would, due to the oil-repellent, i.e. olephobic, characteristics of the granule surfaces. This test so well demonstrates the surface characteristics of the granules that it can be employed in determining the economically optimum treatment of the granules that is effective, sample quantities of the granules being sized with sizing solutions of differing concentrations and being "tested" with the drops of oil after drying.

It will be seen from the preceding examples that only a very small amount of the oleophobic fluorocarbon sizing agent is necessary to adequately render the granules stain-resistant. In the interests of economy, a minimum amount of the sizing agent should be employed consistent with rendering the granules adequately oleophobic. We have found that in most instances only about 0.025 pound per ton to about 0.1 pound per ton of the sizing agent are necessary. In some instances even lower amounts of sizing agent may satisfactorily be employed.

At the time the dispersion or solution of sizing agent is applied, the granules should not be so hot that the solvent or dispersant is flashed off before the sizing agent becomes uniformly distributed and/or reacted in oriented position on the granule surfaces. The maximum temperature permissible consistent with effective coating will vary with the type and concentration of sizing agent employed, the liquid vehicle used, etc. Generally, we have found that where polyvalent metal complexes of fluorocarbon monocarboxylic acids dissolved or dispersed in aqueous vehicles are employed, the granule temperature preferably should not exceed about 300° F. A somewhat greater granule temperature is permissible in the case of water solutions or dispersions of most other sizing agents, a granule temperature up to about 400° F. being suitable where free fluorocarbon monocarboxylic acids or salts thereof are employed. Where solvents or dispersants are used having volatilities different than that of water, the maximum allowable granule temperature will, in general, be lower in the case of a more volatile vehicle and higher in the case of a less volatile vehicle.

The advantages of our invention are also effectively utilized in other bituminous articles containing a mineral granule surfacing, such as an asphalt road carrying granules embedded as a surfacing therein. The granules having the stable minute water-insoluble coating formed from the oleophobic fluorocarbon sizing agent are highly oil-stain resistant while being firmly adhered to the bituminous road surface.

Herein, we have illustrated our invention with the aid of several specific examples. However, it is to be understood that our invention is not intended to be limited to these specific embodiments, other oleophobic fluorocarbon sizing agents being also satisfactory in the treatment of granules.

We claim:

1. A composite sheet body for roofing and siding comprising a bituminous sheet product and a firmly adherent surfacing for the same consisting essentially of oil-stain resistant granules, said granules comprising a mineral granule having a stable minute water-insoluble coating formed from an oleophobic fluorocarbon sizing agent.

2. As a new article of manufacture, oil-stain resistant mineral roofing granules capable of forming an adherent bond with a bituminous sheet product, said granules comprising a base granule having a well-bonded weather-resistant color-coating over the surface thereof, the coated granule having a stable oleophobic fluorocarbon surface coating.

3. As a new article of manufacture, oil-stain resistant mineral roofing granules capable of forming a firm bond with a bituminous sheet product, said granules comprising a base granule having a well-bonded weather-resistant color-coating over the surface thereof, and thereover a stable minute water-insoluble coating formed from an oleophobic fluorocarbon sizing agent.

4. The roofing granules of claim 3 wherein the said coating is an in situ formed aluminum complex of a fluorocarbon monocarboxylic acid having from 5 to 10 fluorinated carbon atoms in the molecule forming a fluorinated "tail."

5. A composite sheet body for roofing and siding comprising a bituminous sheet product and a firmly adherent surfacing for the same consisting essentially of roofing granules as defined in claim 4.

6. The roofing granules of claim 3 wherein said coating includes an in situ advanced chromium complex of a fluorocarbon monocarboxylic acid having from 5 to 10 fluorinated carbon atoms in the molecule forming a fluorinated "tail."

7. A composite sheet body for roofing and siding comprising a bituminous sheet product and a firmly adherent surfacing for the same consisting essentially of roofing granules as defined in claim 6.

8. A composite sheet body for roofing and siding comprising a bituminous sheet product and a firmly adherent surfacing for the same consisting essentially of roofing granules as defined in claim 3.

9. A composite sheet body comprising a bituminous sheet product having mineral granules at least partially embedded therein and firmly adhered thereto, said granules having a stable oleophobic fluorocarbon surface coating.

10. A process for manufacturing oil-stain resistant roofing granules capable of forming an adherent bond with a bituminous sheet product, said process comprising uniformly color-coating mineral granules with a pigment and binder solution, drying and firing the thus coated granules to a tack-free abrasion resistant state, applying a dilute aqueous aluminum chloride solution to the still-hot coated granules to pickle and partially cool the same, and thereafter applying a treatment to the granules of an oleophobic fluorocarbon sizing agent dilutely contained in an aqueous vehicle, said vehicle being dried from the granule surfaces principally by residual heat remaining in the granules.

11. In the process of manufacturing oil-stain resistant roofing granules capable of forming an adherent bond with a bituminous sheet product, the steps comprising applying a treatment to color-coated roofing granules of an oleophobic fluorocarbon sizing agent dilutely contained in an aqueous vehicle and drying said vehicle from the surface of the granules.

12. A bituminous article having a firmly adhered surfacing thereon consisting essentially of oil-stain resistant granules, said granules comprising a mineral granule having a stable minute water-insoluble coating formed from an oleophobic fluorocarbon sizing agent.

References Cited in the file of this patent

UNITED STATES PATENTS

| | | |
|---|---|---|
| 1,238,805 | Overbury | Sept. 4, 1917 |
| 1,314,753 | Overbury | Sept. 2, 1919 |
| 1,572,425 | Fisher | Feb. 9, 1926 |
| 1,631,628 | Fisher | June 7, 1927 |
| 1,991,981 | Hillers | Feb. 19, 1935 |
| 2,108,641 | Blodgett | Feb. 15, 1938 |
| 2,379,358 | Jewett | June 26, 1945 |
| 2,614,051 | Buzzell et al. | Oct. 14, 1952 |
| 2,662,835 | Reid | Dec. 15, 1953 |
| 2,689,801 | D'Alelio | Sept. 21, 1954 |
| 2,739,077 | Goebel | Mar. 20, 1956 |
| 2,758,038 | Lentz et al. | Aug. 7, 1956 |